C. B. Pate,
Stump Elevator.

Nº 26,056.      Patented Nov. 8, 1859.

Witnesses:

Inventor:
C. Bird Pate

UNITED STATES PATENT OFFICE.

C. BIRD PATE, OF MOORES HILL, INDIANA.

STUMP-EXTRACTOR.

Specification of Letters Patent No. 26,056, dated November 8, 1859.

*To all whom it may concern:*

Figure 1:
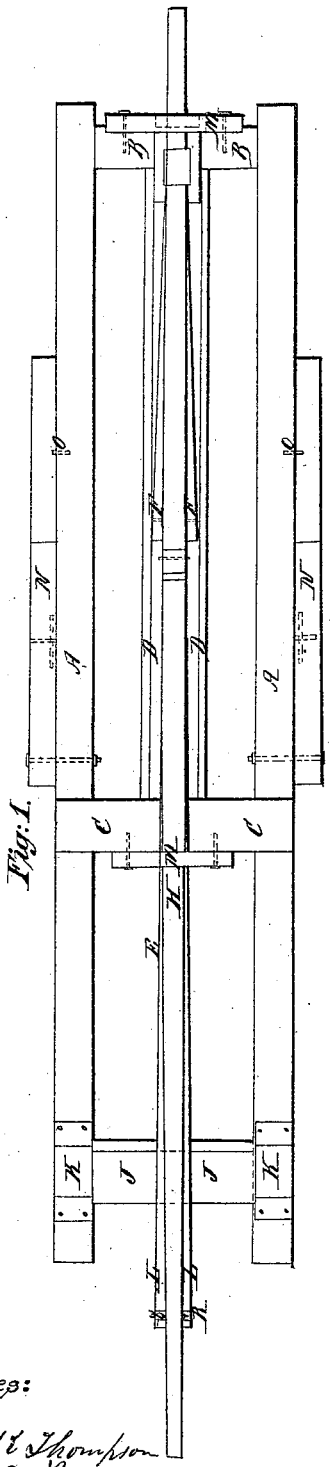
Figure 2:
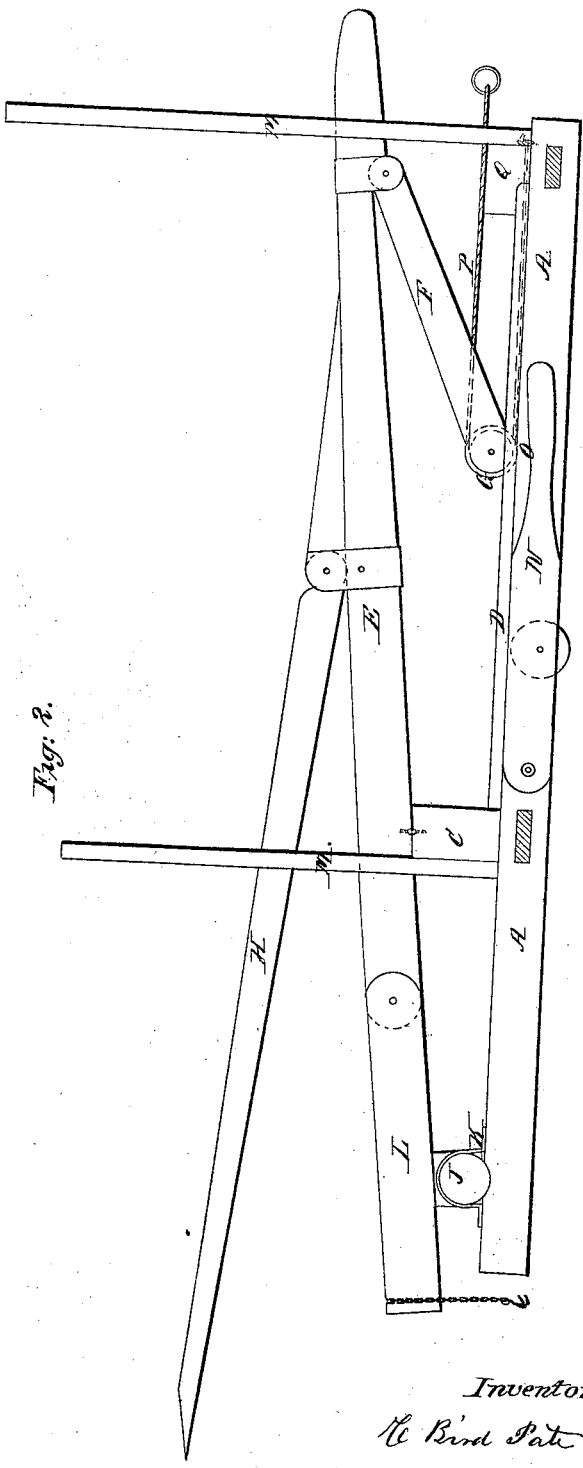

Be it known that I, C. BIRD PATE, of Moores Hill, in the county of Dearborn, in the State of Indiana, have invented a new and useful Combined Machine for Extracting Stumps and Trees; and I do hereby declare that the following is a full, clear, and exact description of the construction and operation of the same, reference being had to the annexed drawings, making a part of this specification, in which Figure 1 is a top view of the entire machine, Fig. 2 a side view of the same, and to the letters of reference marked thereon.

The nature of my invention consists in providing certain simple and convenient conjoint application of lever power by means of which stumps and trees may be extracted, as hereinafter explained.

To enable others skilled in the art to make and use my machine I will proceed to describe its construction and operation.

I construct the groundwork by framing together in the usual way side sills A, A, and sill B, fulcrum C, and grooved center sill D. To fulcrum C is attached lever E by a hinge joint. To the lower side and at the near end of lever E is attached by a socket joint lift lever F in the lower end of which is placed a roller causing lever F to approach a perpendicular position and raising the rear end of lever E. Spar H is thrown forward and the front end of lever L is raised, thus combining the double action of lifting and pushing at the same time, and always throwing the stump or tree from the machine and team.

What I claim as my invention and desire to secure by Letters Patent is—

The arrangement of levers E, F and L and spar H, the whole being for operation conjointly as and for the purpose above set forth.

C. BIRD PATE.

Witnesses:
 JOHN K. THOMPSON,
 ROS. G. BIGNEY.